UNITED STATES PATENT OFFICE.

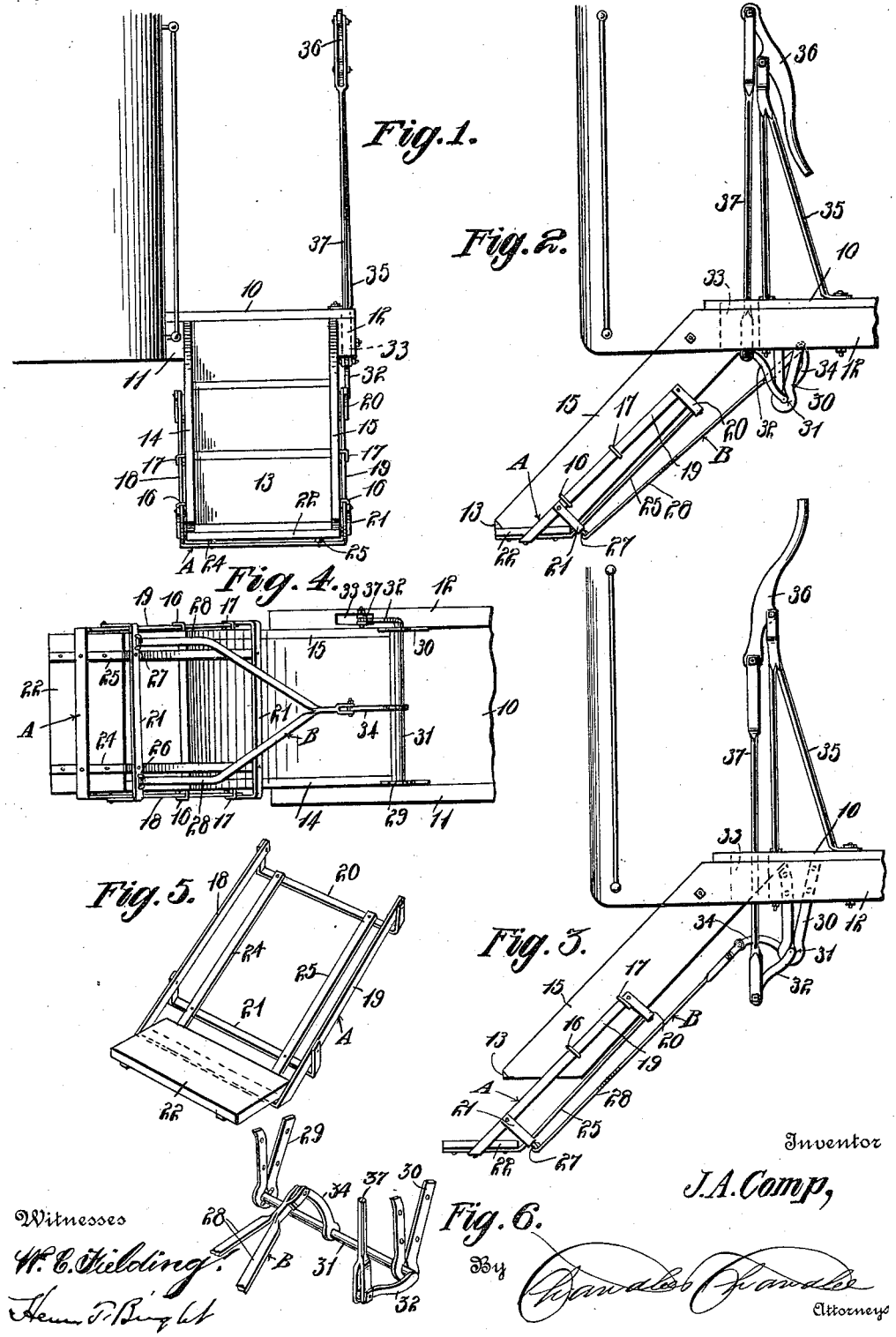

JOHN A. COMP, OF HARRISBURG, PENNSYLVANIA.

EXTENSION CAR-STEP.

1,052,319.   Specification of Letters Patent.   Patented Feb. 4, 1913.

Application filed September 30, 1912. Serial No. 723,155.

*To all whom it may concern:*

Be it known that I, JOHN A. COMP, a citizen of the United States, residing at Harrisburg, in the county of Dauphin, State of Pennsylvania, have invented certain new and useful Improvements in Extension Car-Steps; and I do hereby declare the following to be a full, clear, and exact description of the invention, such as will enable others skilled in the art to which it appertains to make and use the same.

This invention relates to extension car steps.

The object of the invention resides in the provision of a structure which includes the usual fixed steps and an extension step arranged at the lower end of said fixed steps in such manner that same may be folded, neatly and inconspicuously against the fixed bottom step and easily moved away from the latter through the medium of means operable from the platform of a car.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side view of a fragment of a platform of a car and the fixed steps leading to one side of the platform together with the extension step and the means for operating the latter. Fig. 2 an end view of what is shown in Fig. 1 with the extension step folded or in inactive position. Fig. 3 a view similar to Fig. 2 with the extension step lowered or in active position. Fig. 4 a bottom view of what is shown in Fig. 3. Fig. 5 a detail perspective view of the extension step and the sliding frame which carries same, and Fig. 6 a detail perspective view of the operating shaft and its adjacent connections.

Referring to the drawings, 10 indicates the platform of a car which includes inner and outer sills 11 and 12 respectively. Leading to the platform 10 and secured between the sills 11 and 12 is a fixed flight of steps 13, said fixed steps including the usual side members 14 and 15. Mounted on the outer faces of the side members 14 and 15 are corresponding longitudinally alined pairs of eye members 16 and 17 respectively in which are slidably mounted the arms 18 and 19 of a U-shaped member A. Connecting the arms 18 and 19 of the U-shaped member A and disposed respectively in planes at right angles to the U-shaped member A and across the rear side of the fixed steps are U-shaped straps 20 and 21. These straps 20 and 21 and the U-shaped member A constitute a frame which is slidable longitudinally of the fixed steps 13 which carries at its outer end an extension step 22, movable toward and away from the lowermost of the fixed steps 13. The frame formed by the straps 20 and 21 and the U-shaped member A is strengthened by means of longitudinal straps 24 and 25 which are connected to the bight portion of the straps 20 and 21, the bight portion of the U-shaped member A and secured against the under side of the extension step 22. The bight portion of the U-shaped member 21 has mounted thereon spaced eye members 26 and 27 with which are engaged respectively the arms 28 of a Y-shaped member B. Depending from the sills 11 and 12 are journal brackets 29 and 30 respectively and mounted in these brackets is a shaft 31 one end of which is provided with a crank arm 32 disposed directly beneath an opening 33 in the sill 12. Fixed on the shaft 31 between the brackets 29 and 30 is an arm 34 the free end of which is pivotally connected to the outer end of the stem of the Y-shaped member B. Mounted upon the platform 10 directly above the sill 12 is a bracket 35 upon the upper end of which is pivotally mounted an operating lever 36. This lever 36 has one end thereof connected to the crank arm 32 by means of a link 37 which passes through the opening 33 in the sill 12.

By this construction it will be apparent that when one end of the operating lever 36 is depressed the shaft 31 will be rotated and the extension step 22 moved against the lower side of the lowermost of the fixed steps 13. The opposite movement of the operating lever 36 will move the extension step 22 away from the lowermost of the fixed steps, in which last position the extension step may be maintained until it is desired to dispense with the use thereof when it may be readily folded against the lowermost of the fixed steps.

What I claim is:—

The combination with a car platform and fixed steps leading therefrom, of a frame slidable on said fixed steps, an extension step carried by the frame whereby the movement of the latter will shift the extension step toward and away from the lowermost of the fixed steps, a pair of brackets depending from said platform, a shaft journaled in said brackets, an arm on said shaft between the brackets, a Y-shaped member having its arms pivotally connected to said frame and its stem portion pivotally connected to the free end of the arm on said shaft, a bracket rising from said platform, a lever pivoted on said last named bracket, and connections between the lever and said shaft whereby the oscillation of the former will rotate the latter and effect the reciprocation of said frame and the movement of the extension step toward and away from the lowermost of the fixed steps.

In testimony whereof, I affix my signature, in presence of two witnesses.

JOHN A. COMP.

Witnesses:
MARY RUNKLE,
B. N. HERMAN.

Copies of this patent may be obtained for five cents each, by addressing the "Commissioner of Patents, Washington, D. C."